United States Patent
Li et al.

(10) Patent No.: US 10,064,194 B2
(45) Date of Patent: Aug. 28, 2018

(54) METHOD AND APPARATUS FOR ALLOCATING DEVICE-TO-DEVICE D2D COMMUNICATION RESOURCE

(71) Applicant: Huawei Technologies Co., Ltd., Shenzhen, Guangdong (CN)

(72) Inventors: Jian Li, Shanghai (CN); Dageng Chen, Shanghai (CN); Lei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 15/192,501

(22) Filed: Jun. 24, 2016

(65) Prior Publication Data

US 2016/0309459 A1 Oct. 20, 2016

Related U.S. Application Data

(63) Continuation of application No. PCT/CN2013/090748, filed on Dec. 27, 2013.

(51) Int. Cl.
*H04W 72/04* (2009.01)
*H04W 4/08* (2009.01)
(Continued)

(52) U.S. Cl.
CPC ......... *H04W 72/048* (2013.01); *H04L 5/0016* (2013.01); *H04L 5/0053* (2013.01);
(Continued)

(58) Field of Classification Search
None
See application file for complete search history.

(56) References Cited

U.S. PATENT DOCUMENTS 9,629,125 B2 * 4/2017 Lu .................... H04W 72/0406
2011/0300892 A1 12/2011 Hakola et al.
(Continued)

FOREIGN PATENT DOCUMENTS

CN 102638893 A 8/2012
CN 102792745 A 11/2012
(Continued)

OTHER PUBLICATIONS

"Discussion on Discovery for D2D Proximity Services", ETRI, 3GPP TSG-RAN WG2 Meeting #83, Aug. 19-23, 2013, 3 pages, R2-132589.

(Continued)

*Primary Examiner* — Robert C. Scheibel

(57) ABSTRACT

Embodiments of the present invention provide a method and an apparatus for allocating a device-to-device (D2D) communication resource. The method for allocating a device-to-device D2D communication resource in the present invention comprises: receiving, by a first network device, a device-to-device D2D communication capability sent by a user device within coverage; sending, by the first network device according to the communication capability, a resource identifier to each user device within the coverage of the first network device in a D2D group, where the D2D group includes at least two user devices; and sending, by the first network device, a resource allocation message, where the resource allocation message carries D2D communication resource allocation information corresponding to the resource identifier.

16 Claims, 10 Drawing Sheets

(51) Int. Cl.
*H04W 48/16* (2009.01)
*H04L 5/00* (2006.01)
*H04W 8/00* (2009.01)
*H04W 76/14* (2018.01)

(52) U.S. Cl.
CPC ............ *H04W 4/08* (2013.01); *H04W 8/005* (2013.01); *H04W 48/16* (2013.01); *H04W 72/04* (2013.01); *H04W 76/14* (2018.02)

(56) References Cited

U.S. PATENT DOCUMENTS

| | | | |
|---|---|---|---|
| 2012/0243431 A1 | 9/2012 | Chen et al. | |
| 2013/0005377 A1* | 1/2013 | Wang | H04W 72/0406 455/509 |
| 2013/0059583 A1* | 3/2013 | Van Phan | H04W 72/04 455/435.1 |
| 2013/0109301 A1 | 5/2013 | Hakola et al. | |
| 2014/0010099 A1* | 1/2014 | Chiu | H04W 72/085 370/252 |
| 2016/0198455 A1* | 7/2016 | Caretti | H04W 76/023 370/329 |
| 2016/0286465 A1* | 9/2016 | Wu | H04W 48/08 |

FOREIGN PATENT DOCUMENTS

| | | |
|---|---|---|
| CN | 103039103 A | 4/2013 |
| CN | 103327568 A | 9/2013 |
| EP | 2802180 A1 | 11/2014 |

OTHER PUBLICATIONS

"On resource allocation for D2D discovery", ZTE Corporation, 3GPP TSG-RAN WG2 Meeting #84, Nov. 11-15, 2013, 5 pages, R2-134212.

* cited by examiner

METHOD AND APPARATUS FOR ALLOCATING DEVICE-TO-DEVICE D2D COMMUNICATION RESOURCE

CROSS-REFERENCE TO RELATED APPLICATIONS

This application is a continuation of International Application No. PCT/CN2013/090748, filed on Dec. 27, 2013, which is hereby incorporated by reference in its entirety.

TECHNICAL FIELD

The present invention relates to wireless communications technologies, and in particular, to a method and an apparatus for allocating a device-to-device D2D communication resource.

BACKGROUND

A Device-to-Device (D2D) communications technology has been relatively widely applied to the public security field (for example, earthquake relief) and the commercial field (for example, a discount information broadcast in a shopping mall, and personal ticket transfer). After D2D communication starts between user devices, information can be exchanged directly without requiring support of a network device, which reduces network load and improves user experience.

In a type of network-controlled D2D, although a user device does not require support of a network device in a communication process, resources used by the user device during communication, including time, a frequency, a code word, and a spatial signal, still need to be allocated and controlled by the network device. In this mode, reliability, quality, and user experience of communication are more assured. Therefore, this technology also receives more attention from a communications standardization organization, operators, and equipment vendors.

In the prior art, when a network device allocates a resource to a group of user devices that need to perform D2D communication, the network device separately allocates, by using signaling, a different resource identifier to each user device in the D2D communication. For each resource identifier, the network device allocates a corresponding D2D resource for the resource identifier by using a separate resource allocation message. However, in a resource allocation process, signaling resource overheads are high, and resource allocation efficiency is low.

SUMMARY

Embodiments of the present invention provide a method and an apparatus for allocating a device-to-device D2D communication resource, so as to resolve a problem that excessively high signaling overheads are caused because a network device needs to separately send a resource allocation message to each user device in D2D communication.

According to a first aspect, an embodiment of the present invention provides a method for allocating a device-to-device D2D communication resource, including:

receiving, by a first network device, a device-to-device D2D communication capability sent by a user device within coverage;

sending, by the first network device according to the communication capability, a resource identifier to each user device within the coverage of the first network device in a D2D group, where the D2D group includes at least two user devices; and sending, by the first network device, one resource allocation message to the D2D group corresponding to the resource identifier, where the resource allocation message carries D2D communication resource allocation information corresponding to the resource identifier.

With reference to the first aspect, in a first possible implementation manner of the first aspect, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

With reference to the first aspect and the first possible implementation manner of the first aspect, in a second possible implementation manner of the first aspect, for at least two D2D groups, if the following exists: a distance between a user device in a first D2D group and a user device in a second D2D group is greater than or equal to a preset distance, a resource identifier sent by the first network device to each user device within the coverage of the first network device in the first D2D group is the same as a resource identifier sent to each user device within the coverage of the first network device in the second D2D group.

With reference to the first aspect and the first and the second possible implementation manners of the first aspect, in a third possible implementation manner of the first aspect, the method further includes:

negotiating, by the first network device, with a second network device to determine a D2D communication resource that is sent to each user device in the D2D group, where the D2D group includes the user device within the coverage of the first network device and a user device within coverage of the second network device; or negotiating, by the first network device, with a second network device to determine the resource identifier that is sent to each user device in the D2D group and the D2D communication resource corresponding to the resource identifier, where the D2D group includes the user device within the coverage of the first network device and a user device within coverage of the second network device.

With reference to the first aspect and the first, the second, and the third possible implementation manners of the first aspect, in a fourth possible implementation manner of the first aspect, the D2D communication resource corresponding to the resource identifier includes: all or a part of time resources within one resource scheduling unit, all or a part of frequency resources within the resource scheduling unit, and all or a part of code word resources within the resource scheduling unit.

According to a second aspect, an embodiment of the present invention provides a method for allocating a device-to-device D2D communication resource, including:

sending, by a user device, a device-to-device D2D communications capability to a first network device;

receiving, by the user device, a resource identifier sent by the first network device, where all user devices within coverage of the first network device in a D2D group to which the user device belongs receive the resource identifier, and the D2D group includes at least two user devices; and receiving, by the user device, one resource allocation message sent by the network device to the D2D group corresponding to the resource identifier, where the resource allocation message carries D2D communication resource allocation information corresponding to the resource identifier.

With reference to the second aspect, in a first possible implementation manner of the second aspect, before the sending, by a user device, a device-to-device D2D communication capability to a first network device, the method further includes:

periodically accessing, by the user device, the first network device.

With reference to the second aspect and the first possible implementation manner of the second aspect, in a second possible implementation manner of the second aspect, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

With reference to the second aspect and the first and the second possible implementation manners of the second aspect, in a third possible implementation manner of the second aspect, for at least two D2D groups, if the following exists: a distance between a user device in a first D2D group and a user device in a second D2D group is greater than or equal to a preset distance, a resource identifier received from the first network device by each user device within the coverage of the first network device in the first D2D group is the same as a resource identifier received from the first network device by each user device within the coverage of the first network device in the second D2D group.

With reference to the second aspect and the first, the second, and the third possible implementation manners of the second aspect, in a fourth possible implementation manner of the second aspect, the D2D communication resource corresponding to the resource identifier includes: all or a part of time resources within one resource scheduling unit, all or a part of frequency resources within the resource scheduling unit, and all or a part of code word resources within the resource scheduling unit.

According to a third aspect, the present invention provides a first network device, including:

a receiving module, configured to receive a device-to-device D2D communication capability sent by a user device within coverage;

a first sending module, configured to send, according to the communication capability, a resource identifier to each user device within the coverage of the first network device in a D2D group, where the D2D group includes at least two user devices; and a second sending module, configured to send one resource allocation message to the D2D group corresponding to the resource identifier, where the resource allocation message carries D2D communication resource allocation information corresponding to the resource identifier.

With reference to the third aspect, in a first possible implementation manner of the third aspect, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

With reference to the third aspect and the first possible implementation manner of the third aspect, in a second possible implementation manner of the third aspect, for at least two D2D groups, if the following exists: a distance between a user device in a first D2D group and a user device in a second D2D group is greater than or equal to a preset distance, a resource identifier sent to each user device within the coverage of the first network device in the first D2D group is the same as a resource identifier sent to each user device within the coverage of the first network device in the second D2D group.

With reference to the third aspect and the first and the second possible implementation manners of the third aspect, in a third possible implementation manner of the third aspect, the first network device further includes:

a scheduling module, configured to negotiate with a second network device to determine a D2D communication resource that is sent to each user device in the D2D group, where the D2D group includes the user device within the coverage of the first network device and a user device within coverage of the second network device; or configured to negotiate with a second network device to determine the resource identifier that is sent to each user device in the D2D group and the D2D communication resource corresponding to the resource identifier, where the D2D group includes the user device within the coverage of the first network device and a user device within coverage of the second network device.

With reference to the third aspect and the first, the second, and the third possible implementation manners of the third aspect, in a fourth possible implementation manner of the third aspect, the D2D communication resource corresponding to the resource identifier includes: all or a part of time resources within one resource scheduling unit, all or a part of frequency resources within the resource scheduling unit, and all or a part of code word resources within the resource scheduling unit.

According to a fourth aspect, the present invention provides a user device, including:

a sending module, configured to send a device-to-device D2D communication capability to a first network device;

a first receiving module, configured to receive a resource identifier sent by the first network device, where all user devices within coverage of the first network device in a D2D group to which the user device belongs receive the resource identifier, and the D2D group includes at least two user devices; and a second receiving module, configured to receive one resource allocation message sent by the network device to the D2D group corresponding to the resource identifier, where the resource allocation message carries D2D communication resource allocation information corresponding to the resource identifier.

With reference to the fourth aspect, in a first possible implementation manner of the fourth aspect, the sending module is further configured to: before sending the device-to-device D2D communications D2D communication capability to the first network device, periodically access the first network device.

With reference to the fourth aspect and the first possible implementation manner of the fourth aspect, in a second possible implementation manner of the fourth aspect, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

With reference to the fourth aspect and the first and the second possible implementation manners of the fourth aspect, in a third possible implementation manner of the fourth aspect, for at least two D2D groups, if the following exists: a distance between a user device in a first D2D group and a user device in a second D2D group is greater than or equal to a preset distance, a resource identifier received from the first network device by a first receiving module of each user device within the coverage of the first network device in the first D2D group is the same as a resource identifier received from the first network device by a first receiving module of each user device within the coverage of the first network device in the second D2D group.

With reference to the fourth aspect and the first, the second, and the third possible implementation manners of the fourth aspect, in a fourth possible implementation manner of the fourth aspect, the D2D communication resource corresponding to the resource identifier includes: all or a part of time resources within one resource scheduling unit, all or a part of frequency resources within the resource scheduling unit, and all or a part of code word resources within the resource scheduling unit.

According to a fifth aspect, the present invention provides a network device, including a processor and a memory, where the memory stores an execution instruction, and when the network device is operating, the processor communicates with the memory, and the processor executes the execution instruction to enable the network device to execute the method according to the first aspect and any one of the first possible implementation manner of the first aspect to the fourth possible implementation manner of the first aspect.

According to a sixth aspect, the present invention provides a user device, including a processor and a memory, where the memory stores an execution instruction, and when the user device is operating, the processor communicates with the memory, and the processor executes the execution instruction to enable the user device to execute the method according to the second aspect and any one of the first possible implementation manner of the second aspect to the fourth possible implementation manner of the second aspect.

According to the method and the apparatus for allocating a device-to-device D2D communication resource that are provided in the embodiments of the present invention, a same resource identifier is allocated to user devices in a D2D communications group, and a same resource allocation message is used to carry resource allocation information corresponding to the resource identifier, which resolves a problem that high signaling overheads are caused because a network device needs to separately send a resource allocation message to each user device in D2D communication, and effectively reduces the signaling overheads and improves allocation efficiency in a process of allocating, to the user devices in the D2D group, a resource used in a device discovery phase and a resource used in a communication phase.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

Figure 1:
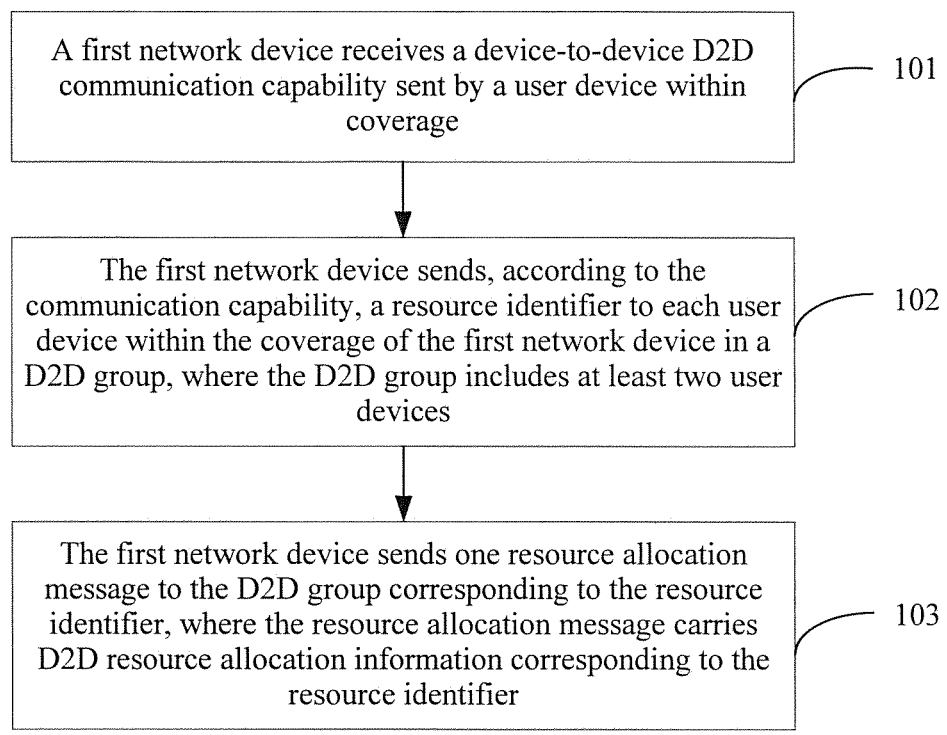
FIG. 1 is a flowchart of an embodiment of a method for allocating a D2D resource according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access) system, a Frequency Division Multiple Access (FDMA, Frequency Division Multiple Access) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems.

A user device in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A network device relevant to the present application may be, for example, a base station, a radio network controller (Radio Network Controller, RNC), or the like.

The base station (such as an access point) may be a base station (BTS, Base Transceiver Station) in GSM or CDMA, or may be a base station (NodeB) in WCDMA, or may be an evolved NodeB (eNB or e-NodeB, evolved Node B) in LTE, which is not limited in this application.

FIG. 1 is a flowchart of an embodiment of a method for allocating a D2D resource according to the present invention. As shown in FIG. 1, the method in this embodiment may include:

Step 101: A first network device receives a device-to-device D2D communication capability sent by a user device within coverage.

Step 102: The first network device sends, according to the communication capability, a resource identifier to each user device within the coverage of the first network device in a D2D group, where the D2D group includes at least two user devices.

Step 103: The first network device sends one resource allocation message to the D2D group corresponding to the resource identifier, where the resource allocation message carries D2D resource allocation information corresponding to the resource identifier.

In an implementation manner, the resource identifier may be a resource identifier used by each user device within the coverage of the first network device in the D2D group in a device discovery phase of a D2D communication process, and a D2D resource corresponding to the resource identifier is a resource used by each user device within the coverage of the first network device in the D2D group in the device discovery phase of the D2D communication process. Because the first network device allocates, for use in the discovery phase, a same resource identifier to each user device within the coverage of the first network device in the D2D group, the user devices in the group use a same resource in the device discovery phase.

In another implementation manner, the resource identifier may be a resource identifier used by each user device within the coverage of the first network device in the D2D group in a device communication phase of a D2D communication process, and a D2D communication resource corresponding to the resource identifier is a resource used by each user device in the D2D group in the device communication phase of the D2D communication process. Because the first network device allocates, for use in the communication phase, a same resource identifier to each user device in the D2D group, the user devices within the coverage of the first network device in the group use a same resource in the device communication phase.

It should be noted that, for a user device in the D2D group, a resource identifier used in the discovery phase and a resource identifier used in the communication phase may be the same or may be different. For a user device in each D2D group, resources used in the device discovery phase and the device communication phase may be the same or may be different.

The resource allocated for the discovery phase and the communication phase may be a time resource, a frequency source, a code word resource, or a combination form of the foregoing resources.

The resource allocation message sent by the first network device carries D2D resource allocation information corresponding to the resource identifier. Because the same resource identifier is allocated, for the discovery phase, to each user device in the D2D group, the network device can enable, simply by using one resource allocation message, each user device in the D2D group to acquire the D2D resource allocation information corresponding to the resource identifier. The user device may determine, according to the resource allocation message, a resource that can be used in the device discovery phase. The network device does not need to send a resource allocation message for multiple times to separately allocate, to each user device, a resource used in the device discovery phase, and can send only one resource allocation message to allocate, to the user devices in the D2D group, a resource used in the device discovery phase.

Similarly, the first network device allocates the same resource identifier to each user device in the D2D group. Because the same resource identifier is allocated, for the communication phase, to each user device in the D2D group, the network device can enable, simply by using one resource allocation message, each user device in the D2D group to acquire the D2D resource allocation information corresponding to the resource identifier. The user device determines, according to the resource allocation message, a resource that can be used in the device communication phase. The network device does not need to send a resource allocation message for multiple times to separately allocate, to each user device, a resource used in the device communication phase, and can send only one resource allocation message to allocate, to the user devices in the D2D group, a resource used in the device communication phase.

According to the method for allocating a device-to-device D2D communication resource according to this embodiment, in this method, a same resource identifier is allocated to user devices in a D2D communication group, and one resource allocation message is used to carry resource allocation information corresponding to the resource identifier, so that signaling overheads are effectively reduced and allocation efficiency is improved in a process of allocating resource information to the user devices in the D2D group.

Figure 2:
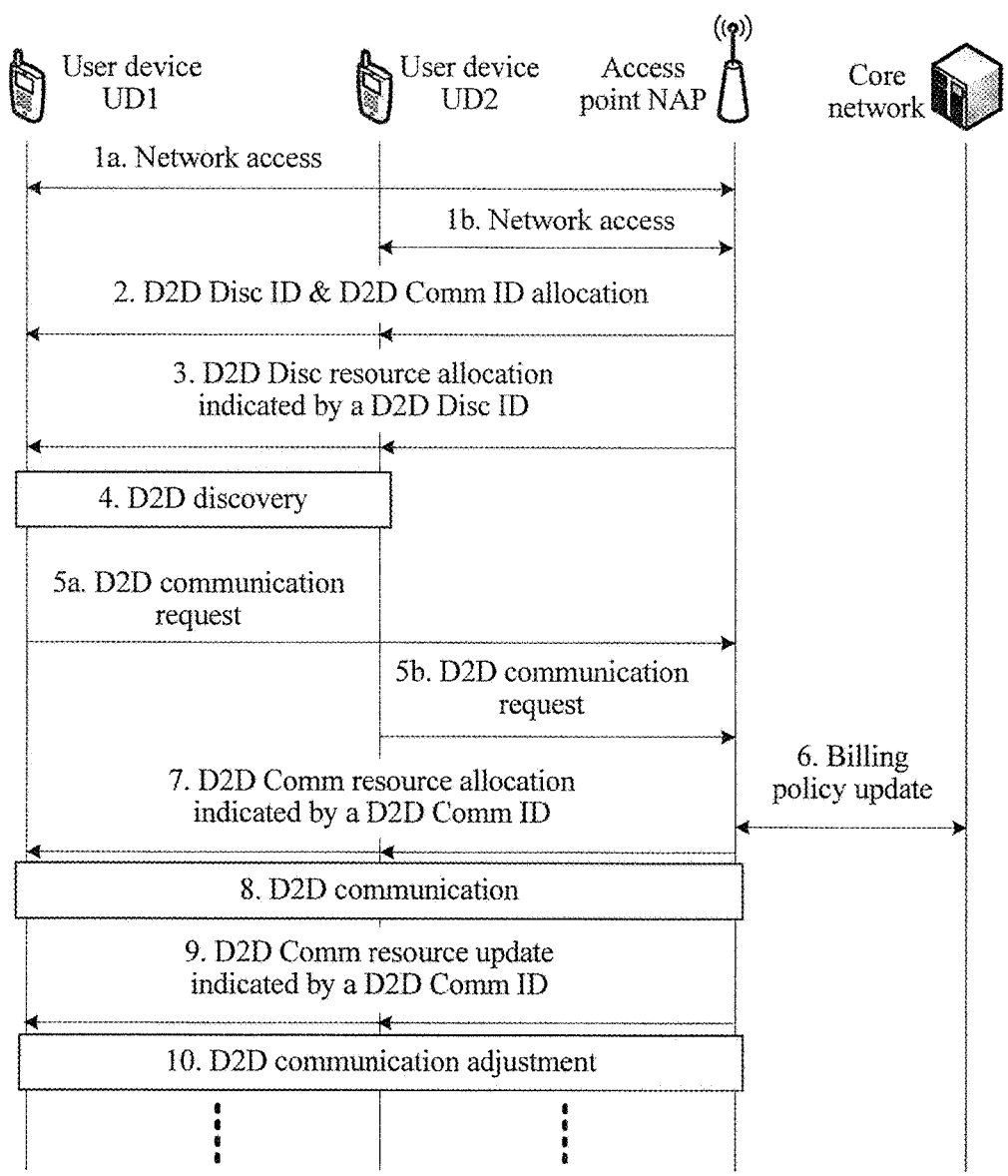
FIG. 2 is a signaling diagram according to an embodiment of the present invention.

FIG. 2 is a signaling diagram of an embodiment of the present invention. As shown in FIG. 2, in this embodiment, user devices (User Device, UD) UD1 and UD2 belong to a same D2D group. A network device is a network access point (Network Access Point, NAP). A Disc ID in the diagram is a resource identifier in a device discovery process, and a Comm ID is a resource identifier in a device communication process. Resources used in the device discovery phase and the device communication phase may be the same or may be different, which is not limited in the present invention.

Step 1a: The UD1 sends an access request to the NAP to access a network, where the access request carries a capability that the UD1 is capable of performing D2D communication.

Step 1b: The UD2 sends an access request to the NAP to access a network, where the access request carries a capability that the UD2 is capable of performing D2D communication.

Step 2: After receiving information about the network access requests of the user devices, the NAP allocates, according to received D2D capability information indications, a D2D Disc ID and a D2D Comm ID to the UD1 and the UD2 by using a downlink signaling message.

The UD1 and the UD2 use the same D2D Disc ID, and the UD1 and the UD2 use the same D2D Comm ID.

Step 3: The NAP allocates, to the UD1 and the UD2, a resource used for D2D communication device discovery, where it should be pointed out that the NAP only needs to use one signaling message when allocating the resource. The UD1 and the UD2 detect, according to the previously received D2D Disc ID, resource allocation signaling delivered by the NAP, so as to determine the resource used for the D2D communication device discovery.

Step 4: The UD1 and the UD2 complete a D2D device discovery process by using an allocated D2D Disc resource, so as to find each other.

Step 5a: The UD1 initiates a D2D communication request to the NAP.

Step 5b: The UD2 initiates a D2D communication request to the NAP.

Step 6: After receiving the D2D communication requests sent by the UD1 and the UD2, the NAP needs to interact with a network entity that is in charge of billing in a core network, so as to adjust a billing policy of D2D communication.

Step 7: The NAP allocates, to the UD1 and the UD2 by using a resource allocation signaling message, a resource used for D2D communication, where it should be pointed out that the NAP only needs to use one signaling message when allocating the resource.

Step 8: After receiving the resource allocation signaling message, the UD1 and the UD2 perform D2D communication by using the resource allocated by the NAP. Optionally, in a process of implementing the D2D communication, the UD1 and the UD2 feed back information about D2D link communication quality to the NAP in a periodic manner or an event trigger manner (for example, the UD1 or the UD2 discovers that the D2D communication quality is lower than a preset threshold).

Step 9: The NAP adjusts, according to the received D2D link communication quality and non-D2D link communication quality that is fed back by a non-D2D communication user device, the resource used for the D2D communication, of which the UD1 and the UD2 is notified by using resource update signaling, so as to minimize interference between a D2D user device and the non-D2D user device.

Step 10: After receiving the resource update signaling, the UD1 and the UD2 adjust the D2D communication. It should be noted that the implementation manner provided and used in this embodiment may further support communication between more than two D2D user devices.

Further, if at least two D2D groups exist, and if a distance between a user device in a first D2D group and a user device in a second D2D group is greater than or equal to a preset distance, a resource identifier sent by a first network device to each user device in the first D2D group is the same as a resource identifier sent to each user device in the second D2D group.

Figure 3:
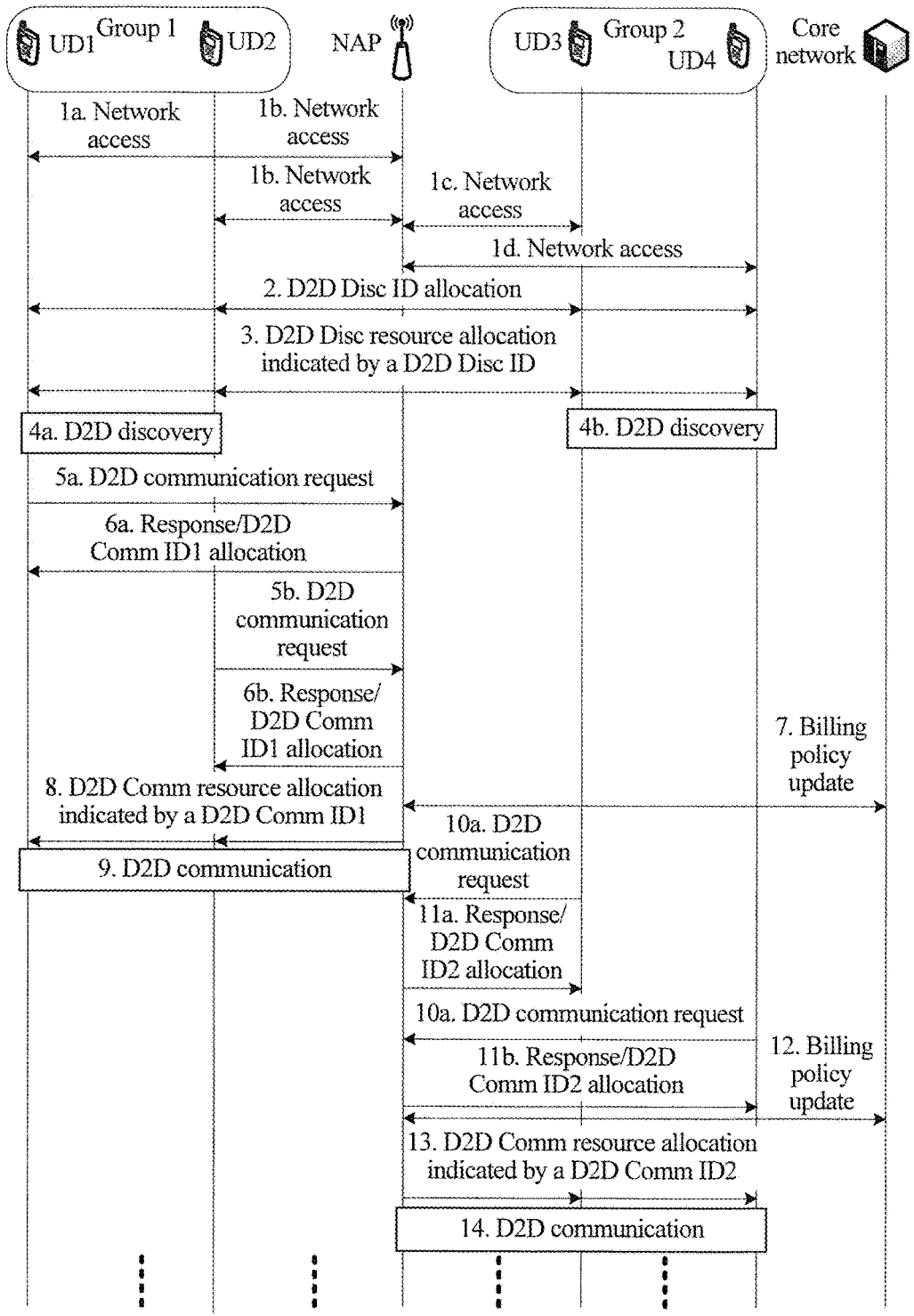
FIG. 3 is a signaling diagram of a method for allocating a resource in a case in which there are two D2D groups.

FIG. 3 is a signaling diagram of a method for allocating a resource in a case in which there are two D2D groups. As shown in FIG. 3, a UD1 and a UD2 form a first D2D group Group 1, and a UD3 and a UD4 form a second D2D group Group 2. If relatively few discovery resources need to be used in a resource discovery phase, even if a same discovery resource is allocated to the foregoing four user devices, no apparent mutual interference is caused, and in step 2, a D2D Disc ID allocated by the NAP to the Group 1 may be the same as a D2D Disc ID allocated to the Group 2.

Figure 4:
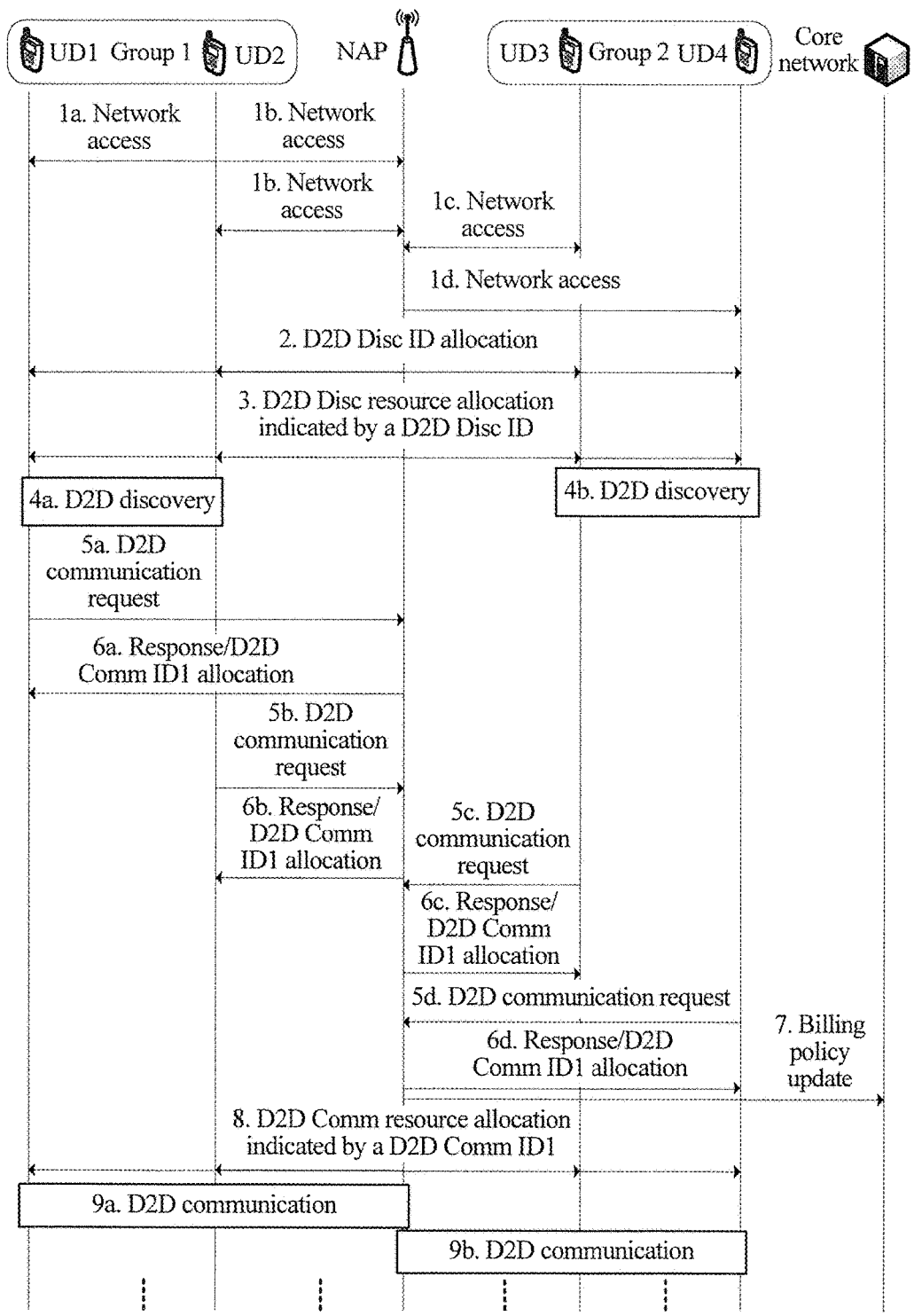
FIG. 4 is another signaling diagram of a method for allocating a resource in a case in which there are two D2D groups.

FIG. 4 is another signaling diagram of a method for allocating a resource in a case in which there are two D2D groups. As shown in FIG. 4, a UD1 and a UD2 form a first D2D group Group 1, and a UD3 and a UD4 form a second D2D group Group 2. If a distance between the UD1 and the UD2 in the Group 1 and a distance between the UD3 and the UD4 in the Group 2 are greater than or equal to a preset distance, allocating a same resource to the UD1, the UD2, the UD3, and the UD4 in this case does not cause apparent mutual interference, and in step 2, a D2D Disc ID allocated by the NAP to the Group 1 is the same as a D2D Disc ID allocated to the Group 2; in addition, a D2D Comm ID allocated by the NAP to the Group 1 in steps 6a and 6b and a D2D Comm ID allocated by the NAP to the Group 2 in steps 6c and 6d are the same and are both a D2D Comm ID1.

Further, before sending a resource identifier to each user device in a D2D group, a first network device further needs to negotiate with a second network device to determine the resource identifier sent to each user device in the D2D group, where the D2D group includes a user device within coverage of the first network device and a user device within coverage of the second network device.

Figure 5:
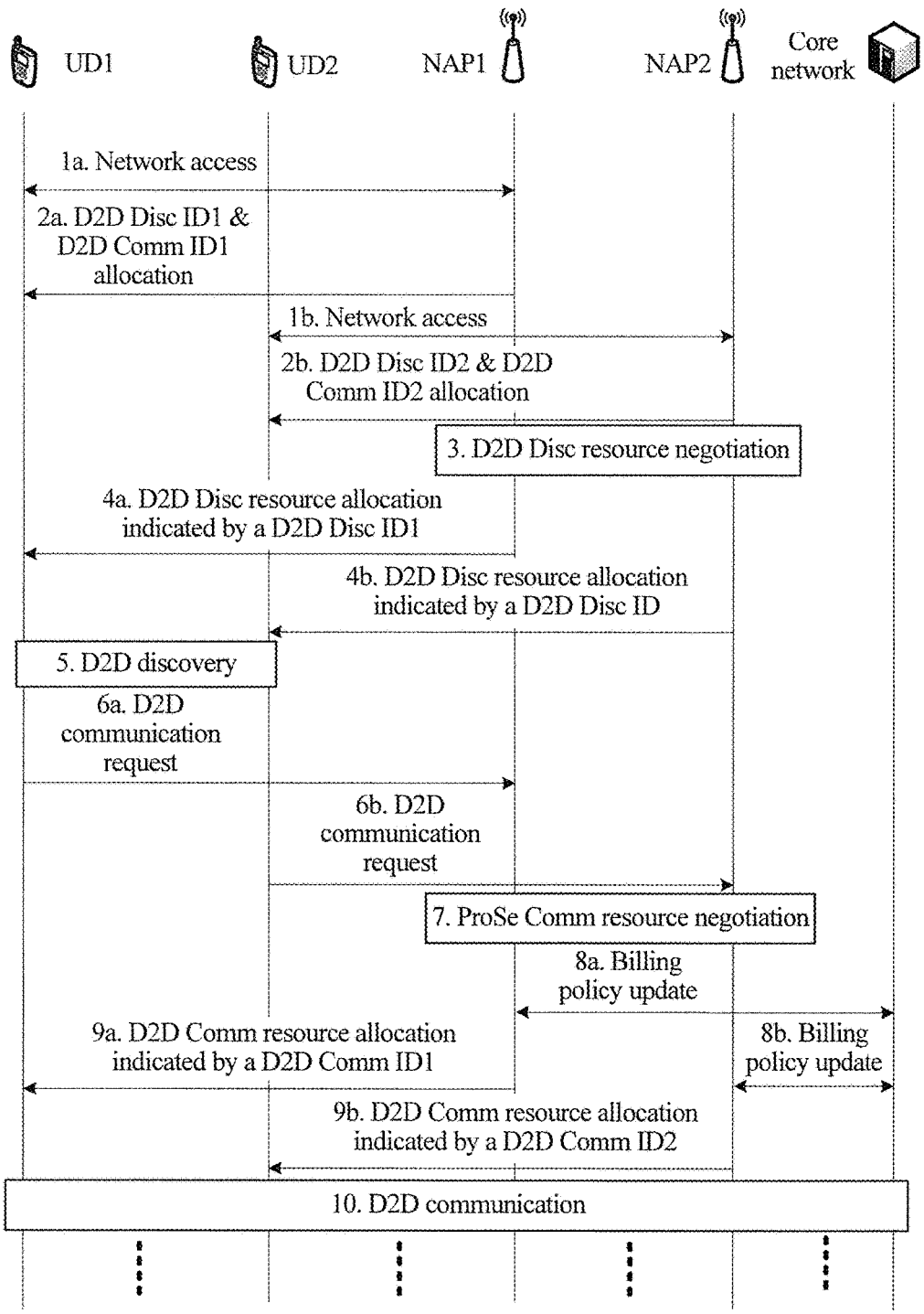
FIG. 5 is a signaling diagram of resource allocation when different user devices are located in cells covered by different network devices.

FIG. 5 is a signaling diagram of resource allocation when different user devices are located in cells covered by different network devices. As shown in FIG. 5, a UD1 and a UD2 form a D2D group, but the UD1 and the UD2 are respectively located in cells covered by different NAPs (a NAP1 and a NAP2) and controlled by the different NAPs. As shown in FIG. 5, specific steps are:

Step 1a: The UD1 sends an access request to the NAP1 to access a network, where the access request carries a capability that the UD1 is capable of performing D2D communication.

Step 1b: The UD2 sends an access request to the NAP2 to access a network, where the access request carries a capability that the UD2 is capable of performing D2D communication.

Step 2a: The NAP1 allocates, to the UD1, a resource allocation identifier D2D Disc ID1 used in a D2D communication device discovery process and a resource allocation identifier D2D Comm ID1 used in a D2D communication process.

Step 2b: The NAP2 allocates, to the UD2, a resource allocation identifier D2D Disc ID2 used in the D2D communication device discovery process and a resource allocation identifier D2D Comm ID2 used in the D2D communication process.

The D2D Disc ID1 and the D2D Disc ID2 may be the same or may be different. Likewise, the D2D Comm ID1 and the D2D Comm ID2 may be the same or may be different.

Step 3: The NAP1 and the NAP2 further need to perform negotiation, so as to allocate a same resource used in the device discovery phase to the UD1 and the UD2.

Step 4a: The NAP1 allocates, to the UD1, a resource used for D2D communication device discovery.

Step 4b: The NAP2 allocates, to the UD2, a resource used for D2D communication device discovery.

Step 5: The UD1 and the UD2 complete a D2D device discovery process by using an allocated D2D Disc resource, so as to find each other.

Step 6a: The UD1 initiates a D2D communication request to the NAP1.

Step 6b: The UD2 initiates a D2D communication request to the NAP2.

Step 7: The NAP1 and the NAP2 also need to perform negotiation, so as to allocate a same resource used in the D2D communication phase to the UD1 and the UD2.

Step 8a: After receiving the D2D communication request sent by the UD1, the NAP1 needs to interact with a network entity that is in charge of billing in a core network, so as to adjust a billing policy of D2D communication.

Step 8b: After receiving the D2D communication request sent by the UD2, the NAP2 needs to interact with a network entity that is in charge of billing in a core network, so as to adjust a billing policy of D2D communication.

Step 9a: The NAP1 allocates, to the UD1 by using a resource allocation signaling message, a resource used for D2D communication.

Step 9b: The NAP2 allocates, to the UD2 by using a resource allocation signaling message, a resource used for D2D communication.

Step 10: After receiving the resource allocation signaling messages, the UD1 and the UD2 perform D2D communication by sing the allocated resources.

That is, the NAP1 and the NAP2 perform negotiation to determine a D2D communication resource sent to each user device in the D2D group, where the D2D group includes a user device in coverage of the NAP1 and a user device in coverage of the NAP2.

Figure 6:
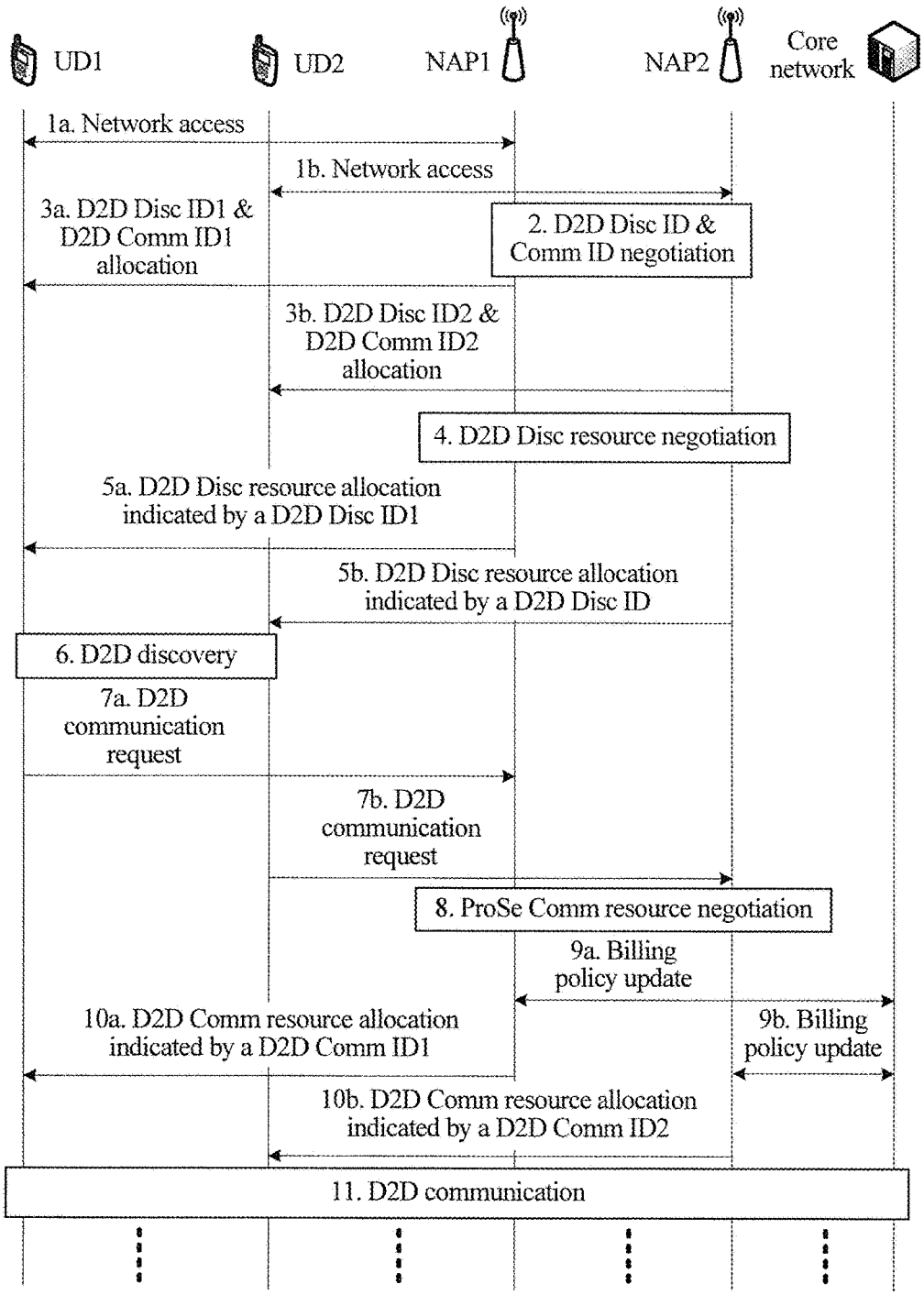
FIG. 6 is another signaling diagram of a method for allocating a resource when different user devices are located in cells covered by different network devices.

FIG. 6 is another signaling diagram of a method for allocating a resource when different user devices are located in cells covered by different network devices. As shown in FIG. 6, a UD1 and a UD2 form a D2D group, but the UD1 and the UD2 are respectively located in coverage of a NAP1 and coverage of a NAP2 and controlled by different NAPs. FIG. 6 has the following differences from the embodiment shown in FIG. 5:

Step 2: The NAP1 and the NAP2 further need to perform negotiation, so as to allocate, to the UD1, the UD2, a UD3, and a UD4, a resource identifier Disc ID in a device discovery process and a resource identifier Comm ID in a device communication process.

Step 3a: The NAP1 allocates, to the UD1, a resource allocation identifier D2D Disc ID1 used in a D2D communication device discovery process and a resource allocation identifier D2D Comm ID1 used in a D2D communication process.

Step 3b: The NAP2 allocates, to the UD2, a resource allocation identifier D2D Disc ID2 used in the D2D communication device discovery process and a resource allocation identifier D2D Comm ID2 used in the D2D communication process.

The D2D Disc ID1 and the D2D Disc ID2 may be the same or may be different. Likewise, the D2D Comm ID1 and the D2D Comm ID2 may be the same or may be different. In addition, a resource is negotiated in steps 4 and 7, for example:

Step 4: The NAP1 and the NAP2 allocate, by means of negotiation, a same resource used in a device discovery phase to the UD1 and the UD2.

Step 8: The NAP1 and the NAP2 allocate, by means of negotiation, a same resource used in a D2D communication phase to the UD1 and the UD2.

That is, the NAP1 and the NAP2 perform negotiation to determine a resource identifier sent to each user device in the D2D group and a D2D communication resource corresponding to the resource identifier, where a user device in the coverage of the NAP1 and a user device in the coverage of the NAP2 are included.

In the foregoing implementation manners, a D2D resource corresponding to a resource identifier may be: all or a part of time resources within one resource scheduling unit, all or a part of frequency resources within the resource scheduling unit, and all or a part of code word resources within the resource scheduling unit.

Figure 7:
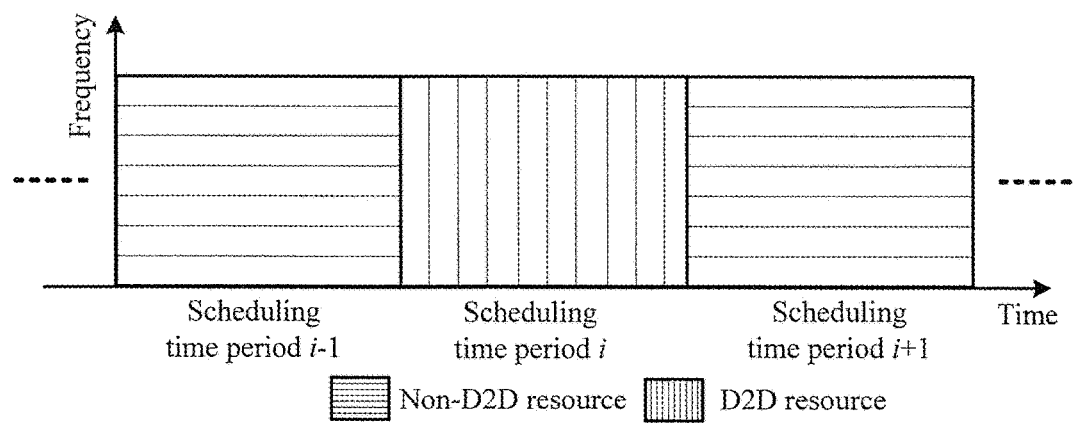
FIG. 7 is a schematic diagram when all frequency resources within one resource scheduling time period are allocated to a D2D user device for use.
Figure 8:
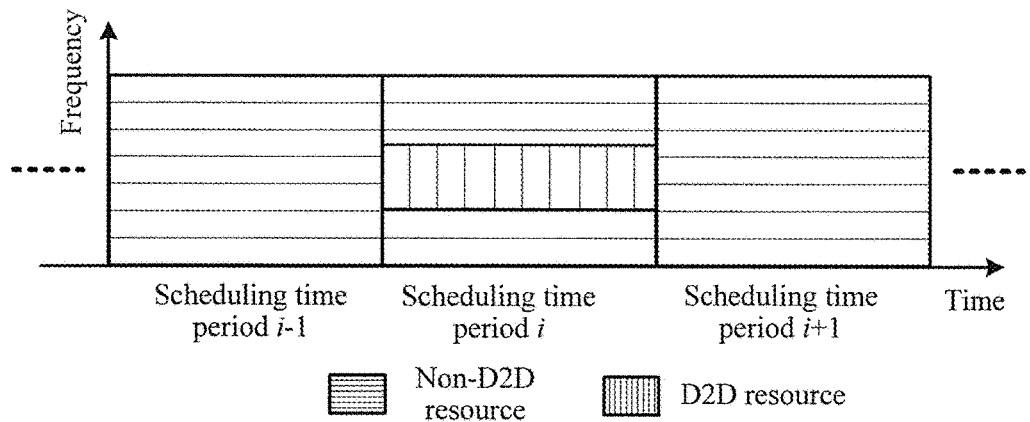
FIG. 8 is a schematic diagram when a part of frequency resources within one resource scheduling time period are allocated to a D2D user device for use.
Figure 9:
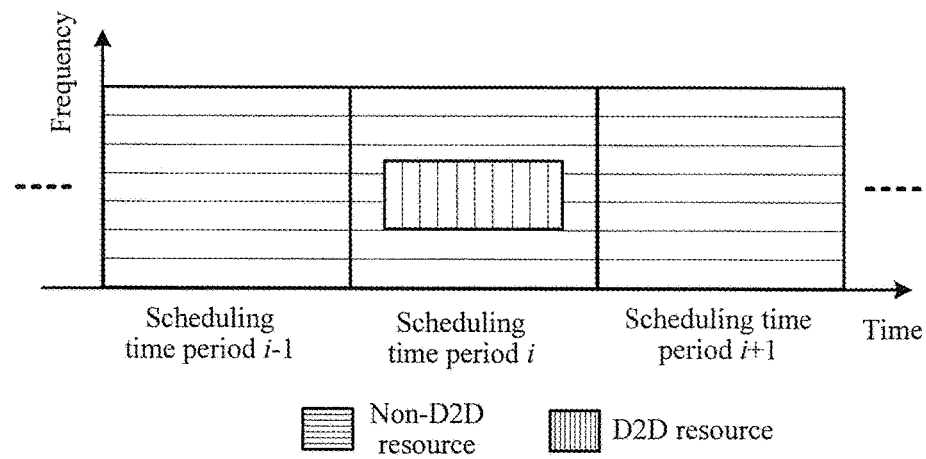
FIG. 9 is a schematic diagram when a part of frequency resources in a part of time within one resource scheduling time period are allocated to a D2D user device for use.

FIG. 7 is a schematic diagram when all frequency resources within one resource scheduling time period are allocated to a D2D user device for use. FIG. 8 is a schematic diagram when a part of frequency resources within one resource scheduling time period are allocated to a D2D user device for use. FIG. 9 is a schematic diagram when a part of frequency resources in a part of resource scheduling time within one resource scheduling time period are allocated to a D2D user device for use. It should be noted that a resource allocated to a D2D user device for use may be exclusive to the D2D user device or may be shared with a non-D2D user device. This is determined by a specific implementation manner of system scheduling, which is not limited in the present invention.

Figure 10:
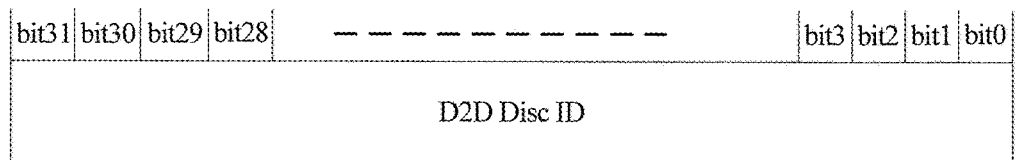
FIG. 10 is a schematic diagram of a D2D resource allocation identifier.
Figure 10:
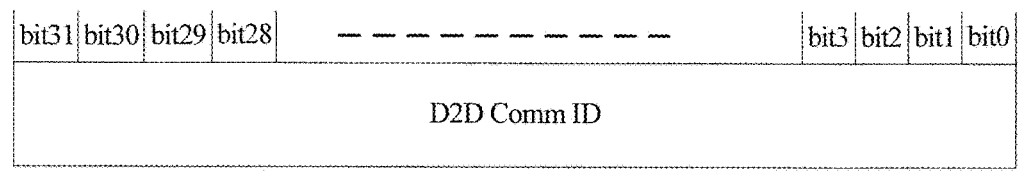
Figure 11:
FIG. 11 is another schematic diagram of a D2D resource allocation identifier.

An implementation manner of a D2D Disc ID or a D2D Comm ID in the foregoing implementation manners is not limited in the present application. In a possible implementation manner, a group of identifiers may all be defined by a system, and all network devices share the same group of identifiers. FIG. 10 is a schematic diagram of a D2D resource allocation identifier. As shown in FIG. 10, a 32-bit (bit) sequence is used as a resource identifier, and a system allocates a group of N sequences as a D2D resource identifier, where N1 sequences are used for a D2D Disc ID, N2 sequences are used for a D2D Comm ID, and N=N1+N2. In another possible implementation manner, a group of identifiers may be separately defined by each network device. FIG. 11 is another schematic diagram of a D2D resource allocation identifier. As shown in FIG. 11, the identifier includes two parts: a network device identifier NAP ID and a D2D user device identifier D2D_UD ID. A function of the NAP ID may be: uniquely identifying a NAP within an entire system, or uniquely identifying a network device that can be detected around a user device. A function of the D2D_UD ID may be: identifying a D2D user device type within a cell covered by a network device, or identifying a D2D user device group within a cell covered by a NAP.

According to the method for allocating a device-to-device D2D communication resource according to this embodiment, in this method, a same resource identifier is allocated to user devices in a D2D group, and a same resource allocation message is used to carry resource allocation information corresponding to the resource identifier, so that signaling overheads are effectively reduced and allocation efficiency is improved in a process of allocating resource information to the user devices in the D2D group.

Figure 12:
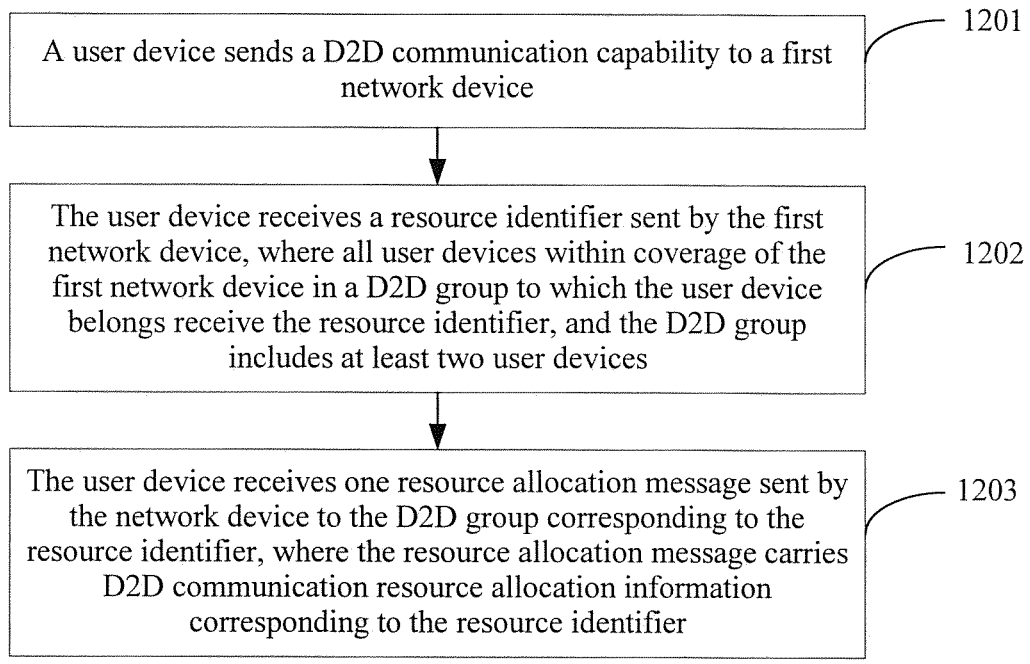
FIG. 12 is a flowchart of another embodiment of a method for allocating a D2D resource according to the present invention.

FIG. 12 is a flowchart of another embodiment of a method for allocating a D2D resource according to the present invention. As shown in FIG. 12, the method in this embodiment may include:

Step 1201: A user device sends a device-to-device D2D communication capability to a first network device.

Step 1202: The user device receives a resource identifier sent by the first network device, where all user devices within coverage of the first network device in a D2D group to which the user device belongs receive the resource identifier, and the D2D group includes at least two user devices.

Step 1203: The user device receives one resource allocation message sent by the network device to the D2D group corresponding to the resource identifier, where the resource allocation message carries D2D communication resource allocation information corresponding to the resource identifier.

In an implementation manner, before sending the device-to-device D2D communication capability to the first network device, the user device may further periodically access the first network device, so as to perform D2D communication at any time according to a need.

In another implementation manner, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

In another implementation manner, for at least two D2D groups, if the following exists: a distance between a user device in a first D2D group and a user device in a second D2D group is greater than or equal to a preset distance, a resource identifier received from the first network device by each user device within the coverage of the first network device in the first D2D group is the same as a resource identifier received from the first network device by each user device within the coverage of the first network device in the second D2D group; because the first network device allocates, for use in the communication phase, a same resource identifier to each user device in the D2D group, the user device in the group uses a same resource in the device communication phase.

It should be noted that, for a user device in the D2D group, a resource identifier used in the discovery phase and a resource identifier used in the communication phase may be the same or may be different. For a user device in each D2D group, resources used in the device discovery phase and the device communication phase may be the same or may be different.

The D2D communication resource corresponding to the resource identifier includes: all or a part of time resources within one resource scheduling unit, all or a part of frequency resources within the resource scheduling unit, and all or a part of code word resources within the resource scheduling unit.

For a specific implementation manner of the foregoing embodiment, refer to the implementation manners of the embodiments shown in FIG. 2 to FIG. 11, and details are not described in the present application again.

According to the method for allocating a device-to-device D2D communication resource according to this embodiment, in this method, a same resource identifier is allocated to user devices in a D2D communication group, and a same resource allocation message is used to carry resource allocation information corresponding to the resource identifier, so that signaling overheads are reduced and allocation efficiency is improved in a process of allocating, to the user devices in the D2D group, a resource used in a device discovery phase and a resource used in a communication phase.

Figure 13:
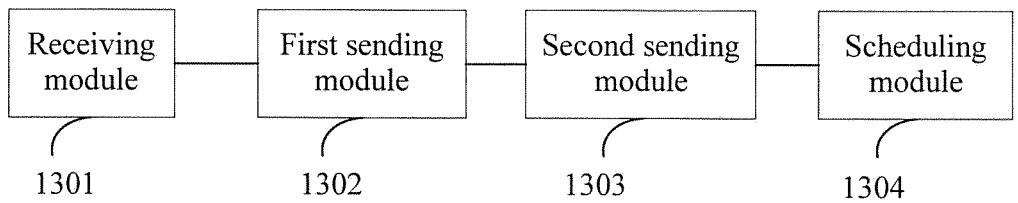
FIG. 13 is a schematic structural diagram of an embodiment of a first network device according to the present invention.

FIG. 13 is a schematic structural diagram of an embodiment of a first network device according to the present invention. As shown in FIG. 13, an apparatus in this embodiment may include:

a receiving module 1301, configured to receive a device-to-device D2D communication capability sent by a user device within coverage;

a first sending module 1302, configured to send, according to the communication capability, a resource identifier to each user device within the coverage of the first network device in a D2D group, where the D2D group includes at least two user devices; and a second sending module 1303, configured to send one resource allocation message to the D2D group corresponding to the resource identifier, where the resource allocation message carries D2D communication resource allocation information corresponding to the resource identifier.

Further, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

Further, for at least two D2D groups, if the following exists: a distance between a user device in a first D2D group and a user device in a second D2D group is greater than or equal to a preset distance, a resource identifier sent to each user device within the coverage of the first network device in the first D2D group is the same as a resource identifier sent to each user device within the coverage of the first network device in the second D2D group.

Further, the first network device further includes: a scheduling module 1304, configured to negotiate with a second network device to determine a D2D communication resource that is sent to each user device in the D2D group, where the D2D group includes the user device within the coverage of the first network device and a user device within coverage of the second network device; or configured to negotiate with a second network device to determine the resource identifier that is sent to each user device in the D2D group and the D2D communication resource corresponding to the resource identifier, where the D2D group includes the user device within the coverage of the first network device and a user device within coverage of the second network device.

Further, the D2D communication resource corresponding to the resource identifier includes: all or a part of time resources within one resource scheduling unit, all or a part of frequency resources within the resource scheduling unit, and all or a part of code word resources within the resource scheduling unit.

The apparatus in this embodiment may be used to execute the technical solution of the method embodiment shown in FIG. 1, and implementation principles and technical effects of the apparatus are similar and are not described herein again.

Figure 14:
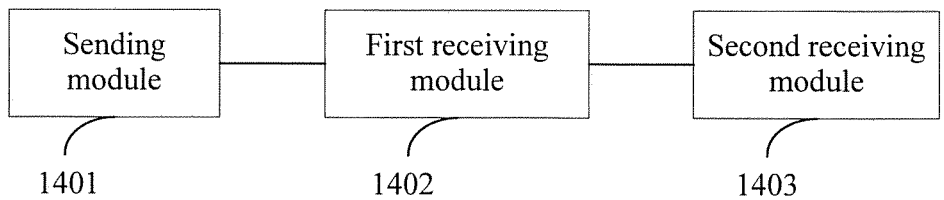
FIG. 14 is a schematic structural diagram of an embodiment of a user device according to the present invention.

FIG. 14 is a schematic structural diagram of an embodiment of a user device according to the present invention. As shown in FIG. 14, an apparatus in this embodiment may include:

a sending module 1401, configured to send a device-to-device D2D communication capability to a first network device;

a first receiving module 1402, configured to receive a resource identifier sent by the first network device, where all user devices within coverage of the first network device in a D2D group to which the user device belongs receive the resource identifier, and the D2D group includes at least two user devices; and a second receiving module 1403, configured to receive one resource allocation message sent by the network device to the D2D group corresponding to the resource identifier, where the resource allocation message carries D2D communication resource allocation information corresponding to the resource identifier.

Further, the sending module 1401 is further configured to: before sending the device-to-device D2D communication capability to the first network device, periodically access the first network device.

Further, the resource identifier is a resource identifier used by each user device within the coverage of the first network device in the D2D group in a device discovery phase of a D2D communication process, and a D2D communication resource corresponding to the resource identifier is a resource used by each user device within the coverage of the first network device in the D2D group in the device discovery phase of the D2D communication process; and/or the resource identifier is a resource identifier used by each user device within the coverage of the first network device in the D2D group in a device communication phase of a D2D communication process, and a D2D communication resource corresponding to the resource identifier is a resource used by each user device within the coverage of the first network device in the D2D group in the device communication phase of the D2D communication process.

Further, for at least two D2D groups, if the following exists: a distance between a user device in a first D2D group and a user device in a second D2D group is greater than or equal to a preset distance, a resource identifier received from the first network device by a first receiving module 1402 of each user device within the coverage of the first network device in the first D2D group is the same as a resource identifier received from the first network device by a first receiving module 1402 of each user device within the coverage of the first network device in the second D2D group.

Further, the D2D communication resource corresponding to the resource identifier includes: all or a part of time resources within one resource scheduling unit, all or a part of frequency resources within the resource scheduling unit, and all or a part of code word resources within the resource scheduling unit.

The apparatus in this embodiment may be used to execute the technical solution of the method embodiment shown in FIG. 12, and implementation principles and technical effects of the apparatus are similar and are not described herein again.

Figure 15:
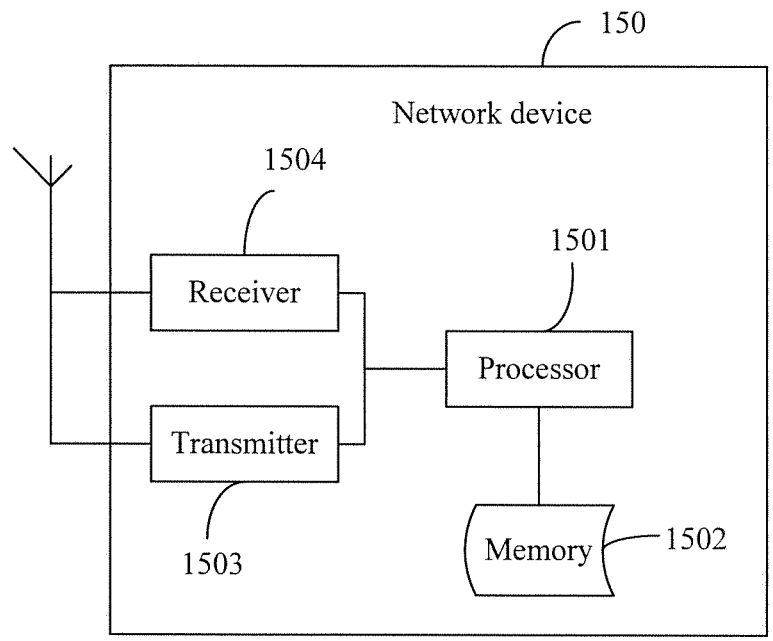
FIG. 15 is a schematic structural diagram of another embodiment of a first network device according to the present invention.

FIG. 15 is a schematic structural diagram of another embodiment of a first network device according to the present invention. As shown in FIG. 15, the network device 150 provided in this embodiment includes a processor 1501 and a memory 1502. The network device 150 may further include a transmitter 1503 and a receiver 1504. The transmitter 1503 and the receiver 1504 may be connected to the processor 1501. The transmitter 1503 is configured to send data or information, the receiver 1504 is configured to receive the data or the information, and the memory 1502 stores an execution instruction. When the network device 150 is operating, the processor 1501 communicates with the memory 1502, and the processor 1501 invokes the execution instruction in the memory 1502 to perform the following operations:

the first network device receives a device-to-device D2D communication capability sent by a user device within coverage;

the first network device sends a resource identifier to each user device in a D2D group according to the communication capability, where the D2D group includes at least two user devices; and the first network device sends one resource allocation message to the D2D group corresponding to the resource identifier, where the resource allocation message carries D2D communication resource allocation information corresponding to the resource identifier.

Further, the resource identifier is a resource identifier used by each user device in the D2D group in a device discovery phase of a D2D communication process, and a D2D communication resource corresponding to the resource identifier is a resource used by each user device in the D2D group in the device discovery phase of the D2D communication process; and/or the resource identifier is a resource identifier used by each user device in the D2D group in a device communication phase of a D2D communication process, and a D2D communication resource corresponding to the resource identifier is a resource used by each user device in the D2D group in the device communication phase of the D2D communication process.

Further, for at least two D2D groups, if the following exists: a distance between a user device in a first D2D group and a user device in a second D2D group is greater than or equal to a preset distance, a resource identifier sent by the first network device to each user device in the first D2D group is the same as a resource identifier sent to each user device in the second D2D group.

Further, before the resource identifier is sent to each user device in the D2D group, the operations further include: the first network device negotiates with a second network device to determine a resource identifier that is sent to each user device in the D2D group, where the D2D group includes the user device within the coverage of the first network device and a user device within coverage of the second network device.

Further, the D2D communication resource corresponding to the resource identifier includes: all or a part of time resources within one resource scheduling unit, all or a part of frequency resources within the resource scheduling unit, and all or a part of code word resources within the resource scheduling unit.

The network device in this embodiment may be used to execute the technical solution of D2D resource allocation provided in any embodiment of the present invention, and implementation principles and technical effects of the network device are similar and are not described herein again.

Figure 16:
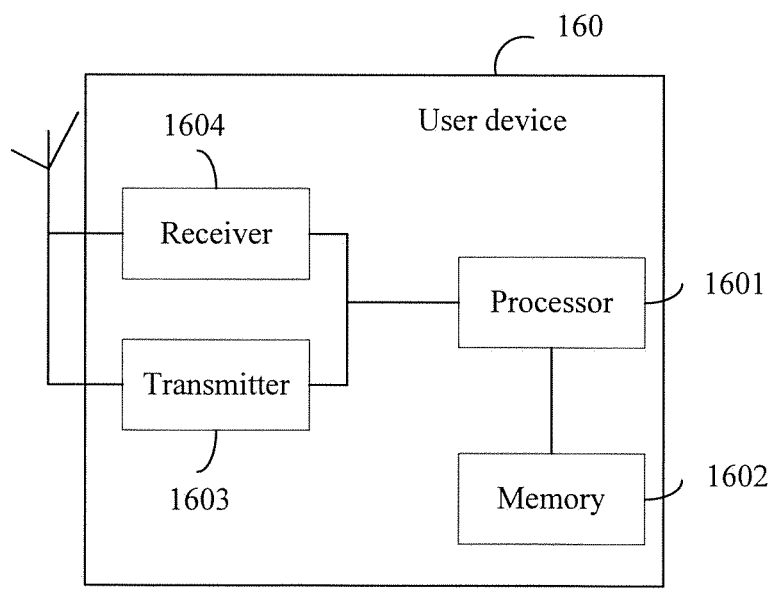
FIG. 16 is a schematic structural diagram of another embodiment of a user device according to the present invention.

FIG. 16 is a schematic structural diagram of another embodiment of a user device according to the present invention. As shown in FIG. 16, the user device 160 provided in this embodiment includes a processor 1601 and a memory 1602. The user device 160 may further include a transmitter 1603 and a receiver 1604. The transmitter 1603 and the receiver 1604 may be connected to the processor 1601. The transmitter 1603 is configured to send data or information, the receiver 1604 is configured to receive the data or the information, and the memory 1602 stores an execution instruction. When the user device 160 is operating, the processor 1601 communicates with the memory 1602, and the processor 1601 invokes the execution instruction in the memory 1602 to perform the following operations:

the user device sends a device-to-device D2D communication capability to a first network device;

the user device receives a resource identifier sent by the first network device, where all user devices in a D2D group to which the user device belongs receive the resource identifier, and the D2D group includes at least two user devices; and the user device receives one resource allocation message sent by the network device to the D2D group corresponding to the resource identifier, where the resource allocation message carries D2D communication resource allocation information corresponding to the resource identifier.

Further, before the user device sends the device-to-device D2D communication capability to the first network device, the operations further include:

the user device periodically accesses the first network device.

Further, the resource identifier is a resource identifier used by each user device in the D2D group in a device discovery phase of a D2D communication process, and a D2D communication resource corresponding to the resource identifier is a resource used by each user device in the D2D group in the device discovery phase of the D2D communication process; and/or the resource identifier is a resource identifier used by each user device in the D2D group in a device communication phase of a D2D communication process, and a D2D communication resource corresponding to the resource identifier is a resource used by each user device in the D2D group in the device communication phase of the D2D communication process.

Further, for at least two D2D groups, if the following exists: a distance between a user device in a first D2D group and a user device in a second D2D group is greater than or equal to a preset distance, a resource identifier received from the first network device by each user device in the first D2D group is the same as a resource identifier received from the first network device by each user device in the second D2D group.

Further, the D2D communication resource corresponding to the resource identifier includes: all or a part of time resources within one resource scheduling unit, all or a part of frequency resources within the resource scheduling unit, and all or a part of code word resources within the resource scheduling unit.

The network device in this embodiment may be used to execute the technical solution of D2D resource allocation provided in any embodiment of the present invention, and implementation principles and technical effects of the network device are similar and are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for allocating a device-to-device (D2D) communication resource, comprising:
   receiving, by a first network device, a D2D communication capability sent by a user device within coverage;
   sending, by the first network device according to the D2D communication capability, a D2D communication resource identifier to each user device within the coverage of the first network device in a first D2D group of at least two D2D groups, wherein the first D2D group comprises at least two user devices; and
   sending, by the first network device, one resource allocation message to the first D2D group corresponding to the D2D communication resource identifier, wherein the resource allocation message carries D2D communication resource allocation information corresponding to the D2D communication resource identifier,
   wherein when a distance between a user device in the first D2D group and a user device in a second D2D group of the at least two D2D groups is greater than or equal to a preset distance, the D2D communication resource identifier sent by the first network device to each user device within the coverage of the first network device in the first D2D group is the same as a D2D communication resource identifier sent to each user device within the coverage of the first network device in the second D2D group.

2. The method according to claim 1, wherein:
   the D2D communication resource identifier is a resource identifier used by each user device within the coverage of the first network device in the first D2D group in a device discovery phase of a D2D communication process, and a D2D communication resource corresponding to the D2D communication resource identifier is a resource used by each user device within the coverage of the first network device in the first D2D group in the device discovery phase of the D2D communication process; or
   the D2D communication resource identifier is a resource identifier used by each user device within the coverage of the first network device in the first D2D group in a device communication phase of a D2D communication process, and a D2D communication resource corresponding to the D2D communication resource identifier is a resource used by each user device within the coverage of the first network device in the first D2D group in the device communication phase of the D2D communication process.

3. The method according to claim 1, further comprising:
   negotiating, by the first network device, with a second network device to determine a D2D communication resource that is sent to each user device in the first D2D group, wherein the first D2D group comprises the user device within the coverage of the first network device and a user device within coverage of the second network device; or
   negotiating, by the first network device, with a second network device to determine the D2D communication resource identifier that is sent to each user device in the first D2D group and the D2D communication resource corresponding to the D2D communication resource identifier, wherein the first D2D group comprises the user device within the coverage of the first network device and a user device within coverage of the second network device.

4. The method according to claim 1, wherein the D2D communication resource corresponding to the D2D communication resource identifier comprises: all or a part of time resources within one resource scheduling unit, all or a part of frequency resources within the resource scheduling unit, and all or a part of code word resources within the resource scheduling unit.

5. A method for allocating a device-to-device (D2D) communication resource, comprising:
   sending, by a user device, a D2D communication capability to a first network device;
   receiving, by the user device, a resource identifier sent by the first network device, wherein all user devices within coverage of the first network device in a first D2D group of at least two D2D groups to which the user device belongs receive the resource identifier, and the first D2D group comprises at least two user devices; and
   receiving, by the user device, one resource allocation message sent by the first network device to the first D2D group corresponding to the resource identifier, wherein the resource allocation message carries D2D communication resource allocation information corresponding to the resource identifier,
   wherein when a distance between a user device in the first D2D group and a user device in a second D2D group of the at least two D2D groups is greater than or equal to a preset distance, the resource identifier received from the first network device by each user device within the coverage of the first network device in the first D2D group is the same as a resource identifier received from the first network device by each user device within the coverage of the first network device in the second D2D group.

6. The method according to claim 5, wherein before sending, by the user device, the device-to-device (D2D) communication capability to the first network device, the method further comprises:
   periodically accessing, by the user device, the first network device.

7. The method according to claim 5, wherein:
   the resource identifier is a resource identifier used by each user device within the coverage of the first network device in the first D2D group in a device discovery phase of a D2D communication process, and a D2D communication resource corresponding to the resource identifier is a resource used by each user device within the coverage of the first network device in the first D2D group in the device discovery phase of the D2D communication process; or
   the resource identifier is a resource identifier used by each user device within the coverage of the first network device in the first D2D group in a device communication phase of a D2D communication process, and a D2D communication resource corresponding to the resource identifier is a resource used by each user device within the coverage of the first network device in the first D2D group in the device communication phase of the D2D communication process.

8. The method according to claim 5, wherein the D2D communication resource corresponding to the resource identifier comprises: all or a part of time resources within one resource scheduling unit, all or a part of frequency resources within the resource scheduling unit, and all or a part of code word resources within the resource scheduling unit.

9. A first network device, comprising:
a processor; and
memory coupled to the processor, the memory comprising instructions that, when executed by the processor, cause the first network device to:
receive a device-to-device (D2D) communication capability sent by a user device within coverage;
send, according to the communication capability, a resource identifier to each user device within the coverage of the first network device in a first D2D group of at least two D2D groups, wherein the first D2D group comprises at least two user devices; and
send one resource allocation message to the first D2D group corresponding to the resource identifier, wherein the resource allocation message carries D2D communication resource allocation information corresponding to the resource identifier,
wherein when a distance between a user device in the first D2D group and a user device in a second D2D group of the at least two D2D groups is greater than or equal to a preset distance, the resource identifier sent by the first network device to each user device within the coverage of the first network device in the first D2D group is the same as a resource identifier sent to each user device within the coverage of the first network device in the second D2D group.

10. The first network device according to claim 9, wherein:
the resource identifier is a resource identifier used by each user device within the coverage of the first network device in the first D2D group in a device discovery phase of a D2D communication process, and a D2D communication resource corresponding to the resource identifier is a resource used by each user device within the coverage of the first network device in the first D2D group in the device discovery phase of the D2D communication process; or
the resource identifier is a resource identifier used by each user device within the coverage of the first network device in the first D2D group in a device communication phase of a D2D communication process, and a D2D communication resource corresponding to the resource identifier is a resource used by each user device within the coverage of the first network device in the first D2D group in the device communication phase of the D2D communication process.

11. The first network device according to claim 9, further comprising instructions that, when executed by the processor, cause the first network device to:
negotiate with a second network device to determine a D2D communication resource that is sent to each user device in the first D2D group, wherein the first D2D group comprises the user device within the coverage of the first network device and a user device within coverage of the second network device; or
negotiate with a second network device to determine the resource identifier that is sent to each user device in the first D2D group and the D2D communication resource corresponding to the resource identifier, wherein the first D2D group comprises the user device within the coverage of the first network device and a user device within coverage of the second network device.

12. The first network device according to claim 9, wherein the D2D communication resource corresponding to the resource identifier comprises: all or a part of time resources within one resource scheduling unit, all or a part of frequency resources within the resource scheduling unit, and all or a part of code word resources within the resource scheduling unit.

13. A user device, comprising:
a processor; and
memory coupled to the processor, the memory comprising instructions that, when executed by the processor, cause the user device to:
send a device-to-device (D2D) communication capability to a first network device;
receive a resource identifier sent by the first network device, wherein all user devices within coverage of the first network device in a first D2D group of at least two D2D groups to which the user device belongs receive the resource identifier, and the first D2D group comprises at least two user devices; and
receive one resource allocation message sent by the first network device to the first D2D group corresponding to the resource identifier, wherein the resource allocation message carries D2D communication resource allocation information corresponding to the resource identifier,
wherein when a distance between a user device in the first D2D group and a user device in a second D2D group of the at least two D2D groups is greater than or equal to a preset distance, the resource identifier received from the first network device by each user device within the coverage of the first network device in the first D2D group is the same as a resource identifier received from the first network device by each user device within the coverage of the first network device in the second D2D group.

14. The user device according to claim 13, wherein the memory further comprises instructions that, when executed by the processor, cause the user device to: periodically access the first network device before sending the D2D communication capability to the first network device.

15. The user device according to claim 13, wherein:
the resource identifier is a resource identifier used by each user device within the coverage of the first network device in the first D2D group in a device discovery phase of a D2D communication process, and a D2D communication resource corresponding to the resource identifier is a resource used by each user device within the coverage of the first network device in the first D2D group in the device discovery phase of the D2D communication process; or
the resource identifier is a resource identifier used by each user device within the coverage of the first network device in the first D2D group in a device communication phase of a D2D communication process, and a D2D communication resource corresponding to the resource identifier is a resource used by each user device within the coverage of the first network device in the first D2D group in the device communication phase of the D2D communication process.

16. The user device according to claim 13, wherein the D2D communication resource corresponding to the resource identifier comprises: all or a part of time resources within one resource scheduling unit, all or a part of frequency resources within the resource scheduling unit, and all or a part of code word resources within the resource scheduling unit.

* * * * *